United States Patent [19]

Marks

[11] Patent Number: 4,571,420
[45] Date of Patent: Feb. 18, 1986

[54] QUICK-CURE, FLEXIBLE POLYMER COMPOSITION

[75] Inventor: Allen P. Marks, Richboro, Pa.

[73] Assignee: Rohm and Haas Company, Philadelphia, Pa.

[21] Appl. No.: 581,466

[22] Filed: Feb. 17, 1984

[51] Int. Cl.[4] ............... C08F 3/64; C08F 3/66; C08F 3/68
[52] U.S. Cl. ................... 525/350; 525/16; 525/23; 525/346; 525/344; 524/392
[58] Field of Search ............ 524/392; 525/16, 23, 525/350, 346, 344

[56] References Cited

U.S. PATENT DOCUMENTS 3,333,021  7/1967  Geipert ................. 525/16
3,516,976  6/1970  Hofer et al. ........... 525/309

Primary Examiner—Maurice J. Welsh
Attorney, Agent, or Firm—Michael B. Fein

[57] ABSTRACT

Compositions which remain flexible when cured comprising low $T_g$ polymers containing pendant unsaturation, polyfunctional mercaptan, and vanadium compound, are disclosed. The compositions, which cure upon exposure to air and become tack-free rapidly, are especially suitable for roof mastics, coatings, and caulks.

14 Claims, No Drawings

QUICK-CURE, FLEXIBLE POLYMER COMPOSITION

BACKGROUND OF THE INVENTION

1. Field of the Invention

This invention relates to flexible mastic, coating, and caulk compositions.

2. Description of the Prior Art

Mastics, coatings, and caulk compositions which are designed to remain flexible when cured usually require long periods of time to achieve tack-free properties. This is a problem in many applications; for example, with roof mastics which coat a roof which has previously been coated with a foam, the workers cannot walk on the roof until it becomes tack-free. Although non-flexible, quick tack-free compositions have been provided by others, no one has provided a flexible composition of low Tg which becomes tack-free upon exposure to air as is provided by the present invention. More specifically, others have provided flexible low Tg early tack-free compositions based either on aqueous emulsions, solvent solutions of cured polymers, moisture-cure systems, or reactive systems. The aqueous systems are disadvantageous in that they will not cure well under low temperatures or high humidity. Solvent solutions of cured polymers are disadvantageous in that a large quantity of solvent is used and all of it must evaporate for the system to function. The loss of the solvent is expensive and causes pollution. Moisture-cure systems are disadvantageous in that they are slow and do not cure well under dry conditions. Reactive systems which are two-part compositions are disadvantageous in that they must be mixed and applied shortly after mixing, and that they cannot be stored for a long time after mixing.

German Offenlegungsschrift No. 2,025410, published Dec. 9, 1971, shows compositions comprising unsaturated polyesters which are crosslinked with monounsaturated monomer such as styrene in the presence of an accelerator system comprised of a vanadium compound and thioglycolic ester of at least trihydryic polyols. The composition is said to cure and dry more rapidly than with the use of monohydric thioglycolates, giving tack-free surfaces after complete hardening. At least 20 parts monomer per 80 parts unsaturated polyester is required, and no low $T_g$ polymers which are flexible on cure are taught.

Hofer et al U.S. Pat. No. 3,516,976 shows vinyl monomers which are acrylic acid esters or methacrylic acid esters, for example, methyl acrylate or methylmethacrylate, polymerized by a redox system comprised of an organic vanadium compound and a linear aliphatic primary mercaptan.

Kehr U.S. Pat. Nos. 3,662,023 and 3,697,397 show liquid polyenes having at least two terminal unsaturated groups and a polythiol having multiple pendant or terminal SH groups which crosslinks or cures the polyenes to solid resins or elastomers.

Other prior art which has been considered but is thought to be less relevant are GER DT No. 1,912,426 (Rohm GmbH); U.S. Pat. No. 3,333,021 (Electrochemische Werke); Japanese 71/38710 (Johoku); DL 121,524 (Waibunger University); EP 34,118 (Ceiba Geigy); and U.S. Pat. No. 4,120,721 (W. R. Grace).

It is an object of the present invention to provide soft flexible polymer compositions which become substantially tack-free within a short time at ambient conditions. A further object is to provide elastomeric coatings, caulks, and sealant compositions which are soft, have a low $T_g$, and cure under ambient conditions to obtain a flexible film substantially free from tackiness. A still further object is to provide stable one package compositions which form flexible films which cure upon exposure to ambient air and become tack-free quickly.

SUMMARY OF THE INVENTION

These and other objects as will become apparent from the following disclosure are achieved by the present invention which comprises a composition which remains flexible when cured comprising unsaturated polymer containing pendant unsaturation and having a $T_g$ below about 0° C.; about 0.3 to about 5 equivalents of polyfunctional mercaptan based on equivalents of unsaturation in said composition; and vanadium compound providing about 0.001 to about 0.15% by weight vanadium.

In another aspect the invention comprises said composition in an air-free container and having a long shelf life.

DETAILED DESCRIPTION OF THE INVENTION AND THE PREFERRED EMBODIMENTS

The compositions of the invention have utility as elastomeric coatings, for example, roof coatings, caulks, sealants, and mastics as well as in other areas where a soft, low $T_g$ polymer which remains flexible on cure and cures relatively quickly to become free from tackiness upon exposure to ambient conditions is required. The low $T_g$ polymers should have molecular weights, $\overline{M}_n$, of about 10,000 to 100,000.

The polymers used in the composition contain pendant unsaturation and have a $T_g$ below about 0° C., preferably about −80° C. to about −20° C. The pendant unsaturation can be provided either by copolymerization of suitable monomers that result in pendant unsaturated groups, or by post reaction of copolymers with suitable compounds to achieve the pendant unsaturation.

Suitable pendant unsaturated groups are acrylates, methacrylates, allylethers, allylesters, vinyl ketones, styrenes, or unsaturated fatty acid derivatives. Especially suitable are fatty acid drying oils or derivatives thereof, allylethers, allylesters, or (meth)acrylates.

Suitable unsaturated fatty acid derivatives include, but are not limited to, derivatives of natural fats or oils such as soybean oil, sunflower oil, hemp oil, linseed oil, tung oil, corn oil, cottonseed oil, safflower oil, and oiticica oil. Linseed and tung oil derivatives are most preferred.

Suitable monomers used to form the backbone of the low $T_g$ polymer are acrylic or methacrylic esters, acids or nitriles; styrenes; vinyl halides or acetate; and butadienes. The most preferred backbone monomers are butyl acrylate, acrylonitrile, acrylic acid, 2-ethylhexyl acrylate, isobutyl acrylate, isodecyl methacrylate, lauryl methacrylate, tridecyl methacrylate, hydroxyethyl methacrylate, and hydroxyethyl acrylate.

The low $T_g$ polymer should have about 1 to 20 weight percent pendant unsaturation. Preferably such polymers do not have unsaturation in the backbones.

Based on equivalents of unsaturation in the composition, at least about 0.3 equivalents of polyfunctional mercaptan are present. Preferably, about 0.3 to about 5 equivalents, and more preferably up to about 3 equivalents, are present since large excesses of mercaptan above 3 equivalents do not add to, and sometimes reduce, properties. Suitable polyfunctional mercaptans are trimethylolethane tri(3-mercaptopropionate); trimethylolpropane tri(3-mercaptopropionate); pentaerythritol tetra(3-mercaptoproprionate); dipentaerythritol hexa(3-mercaptopropionate); glycol di(3-mercaptopropionates); trimethylolethane trimercaptoacetate; trimethylolpropane trimercaptoacetate; pentaerythritol tetramercaptoacetate; dipentaerylthritol hexamercaptoacetate; glycol dimercaptopropionates; 2,2'-dimercaptodiethyl ether; trivinylcyclohexyl polymercaptan; and 2,5-dimercapto-1,3,4-thiadiazole.

Based on the weight of the total composition, about 0.001 to about 0.15 percent by weight vanadium is provided by the presence of a vanadium compound, preferably selected from vanadyl acetylacetonate, vanadium trisacetylactonate, vanadium chlorides, vanadium sulfates, vanadium alcoholates, and vanadium complexes of organic acids.

The compositions of the invention are rendered more stable by the presence of about 2 to 10 equivalents of beta-diketone-containing compound per equivalent of vanadium. Suitable beta-diketones include 2,4-pentanedione; 1,1,1-trifluoro-2,4-pentanedione; 1,1,1,-5,5,5-hexafluoro-2,4-pentanedione; 2,4-hexanedione; 2,4-heptanedione; 5-methyl-2,4-hexanedione; 2,4-octanedione; 5,5-dimethyl-2,4-hexanedione; 3-ethyl-2,4-pentanedione; 2,4-decanedione; 2,2-dimethyl-3,5-nonanedione; 3-methyl-2,4-pentanedione; 2,4-tridecanedione; 1-cyclohexyl-1,3-butanedione; 5,5-dimethyl-1,3-cyclohexanedione; 1,3-cyclohexanedione; 1-phenyl-1,3-butanedione; 1(4-biphenyl)-1,3-butanedione; 1-phenyl-1,3-pentanedione; 3-benzyl-2,4-pentanedione; 1-phenyl-5,5-dimethyl-2,4-hexanedione; 1-phenyl-2-butyl-1,3-butanedione; 1-phenyl-3-(2-methoxyphenyl)-1,3-propanedione; 1-(4-nitrophenyl)-1,3-butanedione; 1-(2-furyl)-1,3-butanedione; 1-(tetrahydro-2-furyl)-1,3-butanedione; and dibenzoylmethane. The use of the beta-diketone is especially useful for preserving the shelf life. It has been found that by packaging the composition in an air-free container, long shelf life can be achieved and the composition is ready for application as a coating, mastic, sealant, etc. by merely applying it, usually outdoors, under ambient conditions. Upon exposure to air, even cold air, the compositions cure to flexible materials which become tack-free within a relatively short period of time, usually in 18 to 48 hours. In prior systems, tack-free times of weeks to months were usually required.

Small amounts of unsaturated monomers and oligomers (low molecular weight polymers) can be included in the compositions without detrimental effect, although the use thereof is not preferred.

Other preferred optional additives are pigments, solvents, rheology modifiers, mildewcides, adhesion promoters, etc., as are normally used in flexible coatings, mastics, or caulks.

The following examples are presented to further elucidate the invention, but should not be considered as limiting the invention. All parts and percentages are by weight unless otherwise specified.

EXAMPLES

Examples A–D

The following unsaturated polymer solutions were prepared for use in Examples 1–40.

(A) A copolymer of composition 96% butyl acrylate (BA)/2.5% acrylonitrile (AN)/1.5% acrylic acid (AA) esterified with 4.7% (based on polymer weight) of the methylhydroxyethylamide of linseed oil fatty acid (MHELA) in xylene to produce an 83% (solids content) polymer solution with pendant unsaturated fatty acid drying oil functionality.

(B) A copolymer of composition 91% BA/9.0% hydroxyethyl methacrylate reacted with 2.3% (based on polymer weight) isocyanatoethyl methacrylate in xylene to produce an 83% (solids content) polymer solution with pendant methacrylate functionality.

(C) A copolymer of composition 92.5% BA/2.5% AN/5.0% AA reacted with 1.7% (based on polymer weight) allyl glycidyl ether in xylene to produce a 53% (solids content) polymer solution with pendant allyl functionality.

(D) A copolymer composition like that of polymer solution A except reacted with 2.0% MHELA instead of 4.7% MHELA.

EXAMPLE 1

About 100 g of polymer solution A and 7.0 g of trimethylolpropane tris(3-mercaptopropionate) (TMPTMP), mixed with 2.4 g of a 10 wt% solution of vanadyl triisopropylate in butyl cellosolve, is applied to an aluminum substrate as an 0.08 inch thick wet film. After 20 hours, the film shows reduced tack and does not crack when bent 180 degrees at $-35°$ C.

EXAMPLE 2

Example 1 is repeated except that polymer solution B is used in place of polymer solution A. The resultant film shows reduced tack after 44 hours and does not crack when bent 180 degrees at $-30°$ C.

EXAMPLE 3

Example 1 is repeated except that polymer solution C is used in place of polymer solution A. The resultant film shows reduced tack after 20 hours and does not crack when bent 180 degrees at $-30°$ C.

EXAMPLE 4

Example 1 is repeated except that polymer solution D us used in place of polymer solution A. The resultant film shows reduced tack and is flexible at low temperatures.

EXAMPLES 5–12

Table 1 shows the tack and flexibility of films prepared by the procedure in Example 1. The amounts of TMPTMP and the vanadium source vary as indicated. The vanadium level is approximately 0.05 wt% (vanadium metal based on polymer weight). These examples show the effect of varying the RSH:double bond ratio.

TABLE 1

| Ex. | TMPTMP | Vanadium Source | RSH: double bond Ratio | Tack After 20 hrs | Flexibility at $-30°$ C. |
|---|---|---|---|---|---|
| 5 | 7.0 g | VO(C$_3$H$_7$)3 | 2.5 | fair+ | pass 180° bend |

TABLE 1-continued

| Ex. | TMPTMP | Vanadium Source | RSH: double bond Ratio | Tack After 20 hrs | Flexibility at −30° C. |
|---|---|---|---|---|---|
| 6 | 3.5 g | " | 1.3 | fair | " |
| 7 | 2.0 g | " | 0.71 | fair− | " |
| 8 | 2.1 g | VO(acac)2 | 0.76 | poor+ | " |
| 9 | 2.0 g | " | 0.75 | fair− | " |
| 10 | 3.0 g | " | 1.2 | fair | " |
| 11 | 4.0 g | " | 1.5 | fair | " |
| 12 | 5.0 g | " | 1.9 | fair+ | " |

EXAMPLES 13-19

Table 2 shows the tack and flexibility of films prepared as in Example 1 except substituting pentaerythritol tetra(3-mercaptopropionate) (PETMP) for TMPTMP. These examples show that addition of small amounts of monomers (such as trimethylolpropane trimethacrylate (TMPTM) and methyl methacrylate (MMA)) do not affect the resultant films as long as the mercaptan level is increased to maintain the RSH:double bond ratio close to 1. Approximately 0.06 wt% vanadium is used (added as V(acac)$_3$).

TABLE 2

| Ex. | Monomer | PETMP | RSH: double bond Ratio | Tack After 20 Hrs | Flexibility at −30° C. |
|---|---|---|---|---|---|
| 13 | — | 2.6 g | 1.0 | fair | pass 180° bend |
| 14 | 2.7 g TMPTM | 2.8 g | 0.50 | poor+ | " |
| 15 | 3.2 g MMA | 3.2 g | 0.49 | poor+ | " |
| 16 | — | 4.9 g | 1.9 | fair+ | " |
| 17 | 1.0 g MMA | 4.9 g | 1.3 | fair+ | " |
| 18 | 3.4 g TMPTM | 4.9 g | 0.78 | fair− | " |

COMPARATIVE EXAMPLES 19-21

Table 3 shows the tack and flexibility of films prepared with compositions containing known free radical initiating agents such as cumene hydroperoxide (CHP), cobalt naphthenate-6%cobalt (CoNap), and dimethylaminobenzaldehyde (DMABA). The films were prepared by the procedure of Example 1 using 100 g of polymer solution A but without TMPTMP or vanadyl triisopropylate.

TABLE 3

| Ex. | CHP | CoNap | DMABA | PETMP | Tack After 20 Hrs | Flexibility at −35° C. |
|---|---|---|---|---|---|---|
| 19 | 1.6 g | 1.0 g | — | 4.0 g | poor | pass 180° bend |
| 20 | 1.6 g | 1.0 g | 1.0 g | 4.0 g | poor | pass 180° bend |
| 21 | 1.6 g | 1.0 g | — | — | poor | pass 180° bend |

COMPARATIVE EXAMPLE 22

About 100 g of polymer solution A was mixed with 4.0 grams of PETMP. The resultant film, prepared by the procedure of Example 1, is flexible at −35° C., but without vanadium present, the cured film remains tacky.

EXAMPLES 23-24 AND COMPARATIVE EXAMPLE 25

Approximately 80 g of polymer solution A, 3.5 g of TMPTMP and a weight of a vanadium compound adjusted to give about 0.08 wt% vanadium was mixed with 10 g of butyl cellosolve. Table 4 indicates the tack and flexibility of the resultant films prepared by the procedure of Example 1, as well as the stability (as demonstrated by viscosity change) of the compositions during 4 weeks in an air-tight container at 50° C.

TABLE 4

| | Vandium Source | Tack After 20 Hrs | Flexibility at −30° C. | Viscosity (a) Initial | 2 Wks | 4 Wks |
|---|---|---|---|---|---|---|
| Ex. | | | | | | |
| 23 | VO(acac)2 | fair | pass 180 bend | 18. | 19. | 19.(1s) |
| 24 | V(acac)3 | fair | pass 180 bend | 16. | 16. | 17.(1s) |
| Comp. Ex. | | | | | | |
| 25 | VO(C$_3$H$_7$)3 | fair | pass 180 bend | 19.(s) | 22.(s) | 23.(s) |

(a) Viscosity in centipoise × 0.001.
(s) means a skin formed on the surface.
(1s) means a light skin formed on the surface.

EXAMPLE 26

A formulated elastomeric coating was prepared as follows:
120 g polymer solution A
124 g xylene
100 g silica pigment
3.0 g rheological additive (based on castor oil)
27 g TiO2 pigment
0.4 g V(acac)$_3$
3.0 g PETMP Films of this composition, prepared by the procedure of Example 1, show reduced tack after 20 hours and can be bent 180 degrees at −35° C. without cracking. See Table 5.

COMPARATIVE EXAMPLES 27-31

Table 5 shows the results of films prepared using the procedure of Example 1 prepared from compositions similar to the composition of Example 26 but without PETMP and V(acac)$_3$. Common oxidative cure catalysts, such as cobalt naphthenate-6% cobalt (CoNap), and zinc naphthenate-8% zinc (ZnNap), as well as PETMP or V(acac)3 have been added separately as indicated. Without vanadium, whether or not mercaptan or oxidative cure catalysts or both are present, the films are tacky even after exposure to ambient exterior ultraviolet radiation.

TABLE 5

| | WEIGHT OF ADDITIVES (g) | | | | Tack After 20 Hrs | | Flexibility at −35° C. |
|---|---|---|---|---|---|---|---|
| | PETMP | V(acac)3 | CoNap | ZnNap | INTERIOR | EXTERIOR | |
| Ex. | | | | | | | |
| 26 | 3.0 | 0.4 | — | — | good− | good | pass 180° bend |

TABLE 5-continued

| | WEIGHT OF ADDITIVES (g) | | | Tack After 20 Hrs | | Flexibility |
|---|---|---|---|---|---|---|
| | PETMP | V(acac)3 | CoNap | ZnNap | INTERIOR | EXTERIOR | at −35° C. |
| Comp Ex | | | | | | | |
| 27 | — | — | — | — | v poor | v poor | " |
| 28 | — | — | 0.15 | 0.74 | poor | poor | " |
| 29 | — | 0.4 | — | — | v poor | v poor | " |
| 30 | 3.0 | — | — | — | v poor | v poor | " |
| 31 | 3.0 | — | 0.15 | 0.74 | poor | poor | " |

EXAMPLES 32–35

Various amounts of 2,4-pentanedione (Acac) are added to the composition of Example 26. Table 6 shows the tack and flexibility of the films as well as the stability (as demonstrated by viscosity change) of the compositions placed in an air-tight container for 4 weeks at 50° C.

TABLE 6

| Ex. | Added Acac | Tack After 24 Hrs | Flexibility at −35° C. | Viscosity (a) Initial | 2 wks | 4 wks |
|---|---|---|---|---|---|---|
| 32 | 0 | v good | pass 180° bend | 117 | 133(s) | 135(s) |
| 33 | 0.45 g | v good | pass 180° bend | 114 | 129 | 130(s) |
| 34 | 0.88 g | v good | pass 180° bend | 110 | 121 | 122 |
| 35 | 1.78 g | v good− | pass 180° bend | 102 | 120 | 120 |

(a) Viscosity in Krebb units measured on a Stormer viscometer.
(s) means a skin formed on the surface.

EXAMPLE 36—COMPARATIVE

A sealant formulation containing 2349.1 grams of calcium carbonate, 206.1 grams of rheological modifier (based on castor oil); 102.0 grams of $TiO_2$; 2459.1 grams of Polymer Solution A, and 5.6 grams of methacryloxypropyl trimethoxysilane were tested for relative surface tack after 18 hours at 24° C. (indoors).

EXAMPLE 37—COMPARATIVE

Example 36 was repeated except with the addition of 0.10 grams of Co Naphthenate (6% Co) and 0.5 grams of Zn Naphthenate (8% Zn).

EXAMPLE 38—COMPARATIVE

Example 36 was repeated except 4.2 grams of TMPTMP were added.

EXAMPLE 39—COMPARATIVE

Example 36 was repeated except 0.2 grams of V(acac)3 were added.

EXAMPLE 40

Example 36 was repeated except, in accordance with the invention, 0.21 grams V(acac)3 and 4.2 grams TMPTMP were added. The relative surface tack for Example 40 was very good whereas for each of the comparative sealants 36 through 39 the relative surface tack was poor.

The V(acac)3 was added as a 2% solution in Xylene.

While the invention has been described herein in substantial detail, various alternatives, examples, and improvements should be readily apparent to those skilled in the art without departing from the spirit and scope of the invention.

I claim:

1. A composition which remains flexible when cured comprising polymer backbone formed from one or more monomers selected from the group consisting of acrylic and methacrylic esters, acids, and nitriles; styrenes; vinyl halides; vinyl acetate; and butadienes, said polymer containing pendant unsaturation and having a $T_g$ below about 0° C.; at least about 0.3 equivalents of polyfunctional mercaptans per equivalent of unsaturation in said composition; and vanadium compound providing about 0.001 to about 0.15% by weight vanadium.

2. Composition of claim 1 wherein said pendant unsaturation is provided by fatty acid drying oil or a derivative thereof, allylether, allylester, or (meth)acrylic functionality.

3. Composition of claim 1 further including about 2 to 10 equivalents of beta-diketone-containing compound per equivalent of vanadium.

4. Composition of claim 1 wherein the composition contains less than about 20% by weight of unsaturated monomer.

5. A coating, mastic, or caulk having low tack and a $T_g$ below about 0° C. cured upon exposure to air from the composition of claim 1.

6. Composition of claim 1 wherein said polymer has a $T_g$ of about −80° C. to about −20° C.

7. Composition of claim 1 further including up to 20% by weight oligomer having a molecular weight, $\overline{M}_w$, of less than about 5000.

8. Composition of claim 1 wherein said vanadium compound is selected from the group consisting of vanadyl acetylacetonate, vanadium trisacetylactonate, vanadium chlorides, vanadium sulfates, vanadium alcoholates, and vanadium complexes of organic acids.

9. Composition of claim 1 wherein said mercaptan compound is selected from the group consisting of trimethylolethane tri(3-mercaptopropionate); trimethylolpropane tri(3-mercaptopropionate); pentaerythritol tetra(3-mercaptoproprionate); dipentaerythritol hexa(3-mercaptopropionate); glycol di(3-mercaptopropionates); trimethylolethane trimercaptoacetate; trimethylolpropane trimercaptoacetate; pentaerythritol tetramercaptoacetate; dipentaerylthritol hexamercaptoacetate; glycol dimercaptopropionates; 2,2′-dimercaptodiethyl ether; trivinylcyclohexyl polymercaptan; and 2,5-dimercapto-1,3,4-thiadiazole.

10. Composition of claim 1 wherein said polymer is a copolymer of a major part butyl acrylate and contains pendant fatty acid groups.

11. Composition of claim 1 in the form of a roof mastic further including organic solvents, pigments, and rheology modifiers.

12. Composition of claim 1 in an air-free container and having long shelf-life.

13. Composition of claim 1 wherein said composition comprises up to about 5 equivalents of polyfunctional mercaptan per equivalent of unsaturation.

14. Composition of claim 1 wherein said pendant unsaturation is provided by acrylate, methacrylate, alkyl ethers, allylesters, vinyl ketone, styrene, or an unsaturated fatty acid derivative.

* * * * *